United States Patent
Kondo et al.

(10) Patent No.: US 6,878,219 B2
(45) Date of Patent: Apr. 12, 2005

(54) HIGH STRENGTH STEEL PIPE FOR AN AIR BAG AND A PROCESS FOR ITS MANUFACTURE

(75) Inventors: Kunio Kondo, Mita (JP); Miyuki Yamamoto, Izumioutsu (JP); Takashi Takano, Wakayama (JP); Kenichi Beppu, Wakayama (JP); Susumu Hirano, Funabashi (JP); Keisuke Hitoshio, Hannan (JP); Hidetoshi Kurata, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 11 days.

(21) Appl. No.: 10/304,698

(22) Filed: Nov. 27, 2002

(65) Prior Publication Data

US 2003/0155052 A1 Aug. 21, 2003

Related U.S. Application Data

(63) Continuation of application No. PCT/JP02/03164, filed on Mar. 29, 2002.

(30) Foreign Application Priority Data

Mar. 29, 2001 (JP) ........................................ 2001-095484
Dec. 5, 2001 (JP) ........................................ 2001-371409

(51) Int. Cl.$^7$ .............................. C22C 38/18; C21D 8/10
(52) U.S. Cl. ........................ 148/333; 148/334; 148/335; 148/593; 148/663
(58) Field of Search ................................ 148/519, 520, 148/593, 333, 334, 335, 663, 590

(56) References Cited

FOREIGN PATENT DOCUMENTS

| | | | | |
|---|---|---|---|---|
| JP | 6-264144 | * 9/1994 | ............ | C21D/7/02 |
| JP | 08-325641 | 12/1996 | | |
| JP | 10-140238 | 5/1998 | | |
| JP | 10-140249 | 5/1998 | | |
| JP | 10-140250 | 5/1998 | | |
| JP | 10-140283 | 5/1998 | | |
| JP | 11-199929 | 7/1999 | | |
| JP | 2001-49343 | * 2/2001 | ............ | C21D/9/08 |
| JP | 2001-049343 | 2/2001 | | |

* cited by examiner

*Primary Examiner*—Deborah Yee
(74) *Attorney, Agent, or Firm*—Clark & Brody

(57) ABSTRACT

In order to manufacture a steel pipe for an air bag which can cope with increase in the pressure of gas blown into an air bag and decreases in the wall thickness of an accumulator, a steel having a composition, mass %, of:

C: 0.05–0.20%, Si: 0.1–1.0%, Mn: 0.20–2.0%,
P: at most 0.025%, S: at most 0.010%, Cr: 0.05–1.0%,
Al: at most 0.10%, if necessary at least one of Mo: at most 0.50%, Ni: at most 1.5%, Cu: at most 0.5%, V: at most 0.2%, Ti: at most 0.1%, Nb: at most 0.1%, and B: at most 0.005%, and also if necessary, at least one of Ca: at most 0.01%, Mg: at most 0.01%, and REM (rare earth elements): at most 0.01%, and a remainder of Fe and impurities is used to produce a steel pipe, and the pipe is then subjected to cold working to predetermined dimensions, then to heating to a temperature of at least the $Ac_1$ transformation temperature followed by quenching, and then to tempering at a temperature no higher than the $Ac_1$ transformation temperature.

16 Claims, 7 Drawing Sheets

HIGH STRENGTH STEEL PIPE FOR AN AIR BAG AND A PROCESS FOR ITS MANUFACTURE

This application is a continuation of International Application No. PCT/JP02/03164, filed Mar. 29, 2002. This PCT application was not in English as published under PCT Article 21(2).

TECHNICAL FIELD

This invention relates to a steel pipe for an air bag, a process for its manufacture, and an accumulator for an air bag. More particularly, it relates to a high strength steel pipe for an air bag in which the steel pipe has high dimensional accuracy and which is excellent with respect to workability and weldability and it has high strength and excellent resistance to bursting, a process for its manufacture, and an accumulator for an air bag.

BACKGROUND ART

In recent years, in the automotive industry, the introduction of apparatuses and systems aimed at the safety of automobiles has been actively promoted. Among these are air bag systems. These are systems which are mounted on an automobile and which, at the time of an automotive collision, expand an air bag with gas or the like between a steering wheel or an instrument panel or the like and a passenger before the passenger impacts therewith, and absorb the kinetic energy of the passenger with the object of reducing injuries thereof.

In the past, air bag systems were of the type employing explosive chemicals, but they are expensive, and due to environmental problems and recycling problems, in recent years, a type has been developed using an accumulator made of a steel pipe filled with argon gas or the like, and this type is increasingly used.

The above-mentioned accumulator is a container which at normal times maintains the gas or the like which is blown into an air bag at the time of the collision of an automobile at a high pressure and which at the time of a collision discharges a high pressure inert gas such as argon gas in a single burst. Accordingly, a steel pipe used as such an accumulator (the steel pipe being hereinafter referred to as a steel pipe for an air bag) is to receive a stress at a high strain rate in an extremely short period of time. Therefore, compared with a simple structure such as a conventional pressure cylinder or a line pipe, the above-described steel pipe is required to have superior dimensional accuracy, workability, and weldability, and it must also have high strength and excellent resistance to bursting.

Taking into consideration use in cold regions, it is also desired that it have sufficient toughness at around −40° C. In recent years, a guarantee of safety has been equally desired in cold regions, and there is a strong demand for such low temperature toughness.

A steel pipe which forms an accumulator is usually obtained by cutting a pipe having an outer diameter of 25–100 mm and a wall thickness of 2–5 mm to the necessary length.

Such a steel pipe for air bags and a process for its manufacture are disclosed in, for example, JP P8-325641A1, JP P10-140238A1, JP P10-140249A1, JP P10-140250A1, and JP P10-140283A1.

Thus, in the past, a steel pipe for an air bag having sufficient performance has been obtained. However, as the trend towards a decrease in the weight of automobiles becomes ever stronger in recent years, there has also come to be a demand for a decrease in the size and weight of air bag apparatuses. Therefore, at present, there has come to be a demand for an increase in the pressure of gas blown into air bags and for a decrease in the wall thickness of steel pipes.

The technologies described in the above-mentioned patent publications are all directed at "a steel pipe having high strength and high toughness for an air bag", and they have a tensile strength of at least 590 MPa as a goal. However, as is clear from the examples therein, the tensile strength is at most 883 MPa. Therefore, it is thought that as the pressure of the gas blown into air bags increases and as the wall thickness of steel pipes decreases, there may be cases in which the technologies disclosed in the above-mentioned patent publications are not necessarily adequate from the standpoint of resistance to bursting.

In addition, none of the above-mentioned patent publications has any description of low temperature toughness, so further improvements are desired in order to adequately cope with the present-day requirements described above.

DISCLOSURE OF THE INVENTION

This invention was made in light of the above-described present circumstances, and its object is to provide a high strength steel pipe for air bags which has high dimensional accuracy and excellent workability and weldability and which has a high strength and particularly a high tensile strength of 900 MPa or higher and excellent resistance to bursting and excellent low temperature toughness, and which can adequately cope with an increase in the pressure of gas blown into air bags and a decrease in the thickness of steel pipes, a manufacturing process therefor, and an accumulator for an air bag.

The present inventors performed various investigations aimed at achieving the above object, and they obtained the following information.

(1) In order to cope with an increase in the pressure of gas blown into air bags and a decrease in the wall thickness of steel pipes, it is important to ensure that a steel pipe for an air bag has a tensile strength of at least 900 MPa.

(2) Since a steel pipe for an air bag is assembled by welding before use, it is important for it to have a chemical composition having excellent weldability.

(3) In order to satisfy the conditions of a tensile strength of at least 900 MPa and a chemical composition having excellent weldability, it is necessary for the chemical composition of a steel pipe for an air bag to be a low-C, Cr-containing steel.

(4) The conditions necessary for imparting good resistance to bursting to a steel pipe for an air bag are to obtain a prescribed dimensional accuracy and good surface properties. For this purpose, a cold working process can be employed. However, if a steel pipe for an air bag is finished by a cold working process, the toughness in the circumferential direction of the steel pipe (corresponding to the direction perpendicular to the longitudinal direction of rolling when the steel pipe is unrolled, which is referred to below as the T direction; see FIG. 4 described below) greatly decreases, resulting in a decrease in the resistance to bursting.

Based on the above information, various low-C, Cr-containing steel pipes finished by cold working were prepared by making seamless steel pipes by hot working and subjecting them to cold drawing to enhance their dimensional accuracy, and they were used to investigate the relationship between heat treatment after cold drawing and toughness in the T direction.

Namely, using steels having various steel compositions, seamless steel pipes having nominal dimensions of an outer diameter of 70 mm and a wall thickness of 4.1 mm were manufactured by a hot pipe-making process. The seamless steel pipes were then subjected to cold drawing to finish them to an outer diameter of 60.33 mm and a wall thickness of 3.35 mm, and the relationship between heat treatment after cold drawing and toughness in the T direction was investigated.

As one example of results of the above-described investigation, FIGS. 1–3 show test results for a steel pipe having a composition, in mass percent, of 0.11% C-0.59% Cr-0.24% Si-1.37% Mn-0.013% P-0.001% S-0.26% Cu-0.26% Ni-0.31% Mo-0.025% Ti-0.023% Nb-0.032% Al-0.0025% Ca, and a remainder of Fe and impurities. Toughness was measured using a V-notched Charpy test piece having a width of 2.5 mm as prescribed by JIS Z 2202.

From FIG. 1, it can be seen that the toughness of an as-cold drawn steel pipe has anisotropy between the longitudinal direction of rolling (referred to below as the L direction; see FIG. 4 described below) and the T direction. The ductile-brittle transition temperature (namely, the test temperature at which the percent ductile fracture becomes 50%) in the T direction is approximately 70° C. higher than that in the L direction, and the absorbed energy in the T direction is markedly poorer than that in the L direction.

FIG. 2 shows an example in which the above-described cold drawn steel pipes were subjected to SR heat treatment (stress relief annealing) at a temperature which was below the $Ac_1$ transformation temperature. There is almost no change in the toughness in the T direction caused by the SR treatment, but the toughness in the L direction is improved, so the anisotropy of the toughness is so much the larger.

FIG. 3 shows an example in which after cold drawing, the cold drawn steel pipes were subjected to heating to a temperature which was above the $Ac_1$ transformation temperature followed by quenching, and subsequently to tempering at a temperature which was below the $Ac_1$ transformation temperature.

FIG. 3 shows the toughness in the L direction and the T direction for steel pipes which were cold drawn, then rapidly heated to 920° C. and held at that temperature for ten seconds in a high frequency induction heating apparatus, then quenched for hardening, and finally subjected to tempering at 570° C. The anisotropy between the toughness in the L direction and the T direction of the steel pipe disappears almost entirely, and it is clear that good toughness is obtained even in the T direction.

In FIG. 3, "Ind' QT" means "heating in a high frequency induction heating apparatus followed by quenching and subsequent tempering by normal oven heating."

(5) As a result of a study of the relationship between heat treatment after cold drawing and the toughness in the T direction, in order to improve toughness in the T direction and increase resistance to bursting and to guarantee a desired strength, it was found that it is insufficient to perform tempering at a temperature below the $Ac_1$ transformation temperature, and that it is necessary to at least perform heating to a temperature above the $Ac_1$ transformation temperature followed by quenching, and then to perform tempering at a temperature below the $Ac_1$ transformation temperature. If the above-described heating prior to quenching is rapid heating to a temperature above the $Ac_3$ transformation temperature which is in the austenite range and after holding the temperature for a short length of time, the steel pipes are quenched and then tempered, the toughness in the T direction becomes even better, and an even better resistance to bursting is obtained.

(6) If the chemical composition of a steel pipe for an air bag contains Ca, Mg, or REM (a rare earth element), the toughness in the T direction is improved, and good resistance to bursting is obtained.

(7) The low temperature toughness required of a steel pipe for an air bag can be evaluated by a bursting test by applying an internal pressure in a low temperature atmosphere. This bursting test uses a test member having a structure in which lids are welded to both ends of a steel pipe having a length of approximately 30 cm such that a pressure medium can be charged from one end thereof. For safety, testing is carried out in an ambient temperature regulator enclosed by a steel plate. For a steel pipe having an outer diameter of 40 mm, a wall thickness of 2.6 mm, and a length of 300 mm, for example, even if it exhibits an adequate strength of at least 150 MPa at −40° C., there are cases in which brittle fracture occurs to form an opening running over the entire length of the test piece. This phenomenon can be prevented if ductile fracture is caused to take place. Therefore, efforts were made at elucidating the factors improving low temperature brittleness.

As a result, particularly with respect to the effect of a texture of a steel on low temperature brittleness, it was found that anisotropy has a greater effect than does the constitution of a texture, and that the anisotropy of a certain (crystal) plane orientation in the texture has an intimate relationship to improving low temperature brittleness.

The present invention was accomplished based on the above knowledge, and it is a process of manufacturing a high strength steel pipe for an air bag having excellent bursting resistance characterized by producing a pipe from a steel having a composition, in mass %, of:

| C: 0.05–0.20%, | Si: 0.1–1.0%, | Mn: 0.20–2.0%, |
| P: at most 0.025%, | S: at most 0.010%, | Cr: 0.05–1.0%, |
| Al: at most 0.10%, | | | if necessary at least one of Mo: at most 0.50%, Ni: at most 1.5%, Cu: at most 0.5%, V: at most 0.2%, Ti: at most 0.1%, Nb: at most 0.1%, and B: at most 0.005%, and a remainder of Fe and impurities, subjecting the pipe to cold working to obtain predetermined dimensions, then heating it to a temperature of at least the $Ac_1$ transformation temperature followed by quenching, and thereafter performing tempering at a temperature no higher than the $Ac_1$ transformation temperature.

In a preferred embodiment, the present invention is a process of manufacturing a high strength steel pipe for an air bag having excellent bursting resistance characterized by producing a pipe from a steel having a composition, in mass %, of:

| C: 0.05–0.20%, | Si: 0.1–1.0%, | Mn: 0.20–2.0%, |
| P: at most 0.025%, | S: at most 0.010%, | Cr: 0.05–1.0%, |
| Al: at most 0.10%, | | | if necessary at least one of Mo: at most 0.50%, Ni: at most 1.5%, Cu: at most 0.5%, V: at most 0.2%, Ti: at most 0.1%, Nb: at most 0.1%, and B: at most 0.005%, and at least one of Ca: at most 0.01%, Mg: at most 0.01%, and REM (rare earth elements): at most 0.01%, and a remainder of Fe and impurities, subjecting the pipe to cold working to obtain predetermined dimensions, then heating it to a temperature of at least the $Ac_1$ transformation temperature followed by quenching, and thereafter performing tempering at a temperature no higher than the $Ac_1$ transformation temperature.

From another aspect, the present invention is a steel pipe for an air bag which is manufactured in the above manner, characterized in that the L/T ratio of the X-ray integrated intensity of the {110} plane in a plane perpendicular to the axial direction L to that in a plane perpendicular to the circumferential direction T of a steel pipe for an air bag is at most 4.

From yet another aspect, the present invention is an accumulator for an air bag made from a steel pipe for an air bag manufactured in the above manner.

BEST MODE FOR CARRYING OUT THE INVENTION

Figure 1:
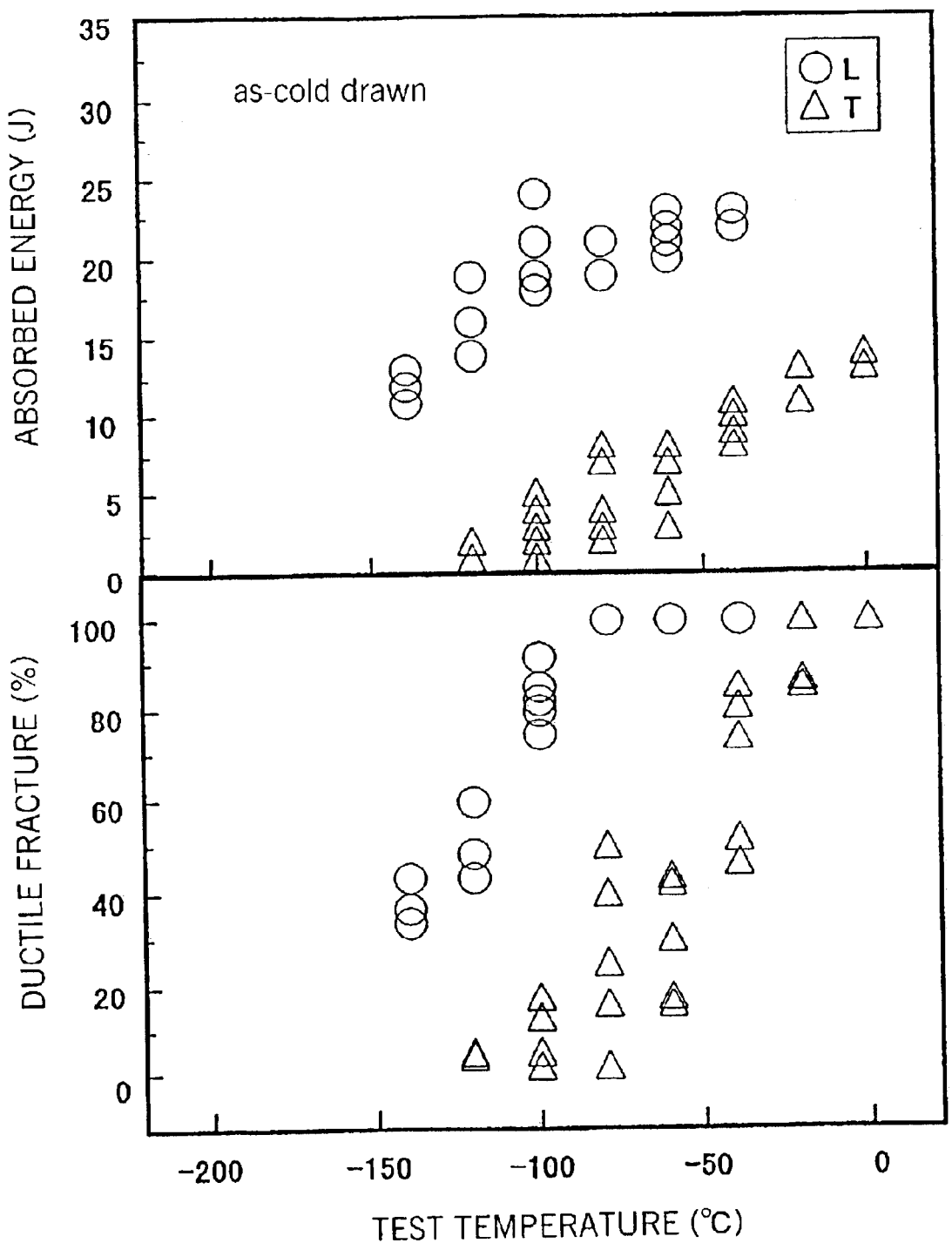
FIG. 1 is a graph showing the anisotropy of the toughness of a steel pipe as cold worked.
Figure 2:
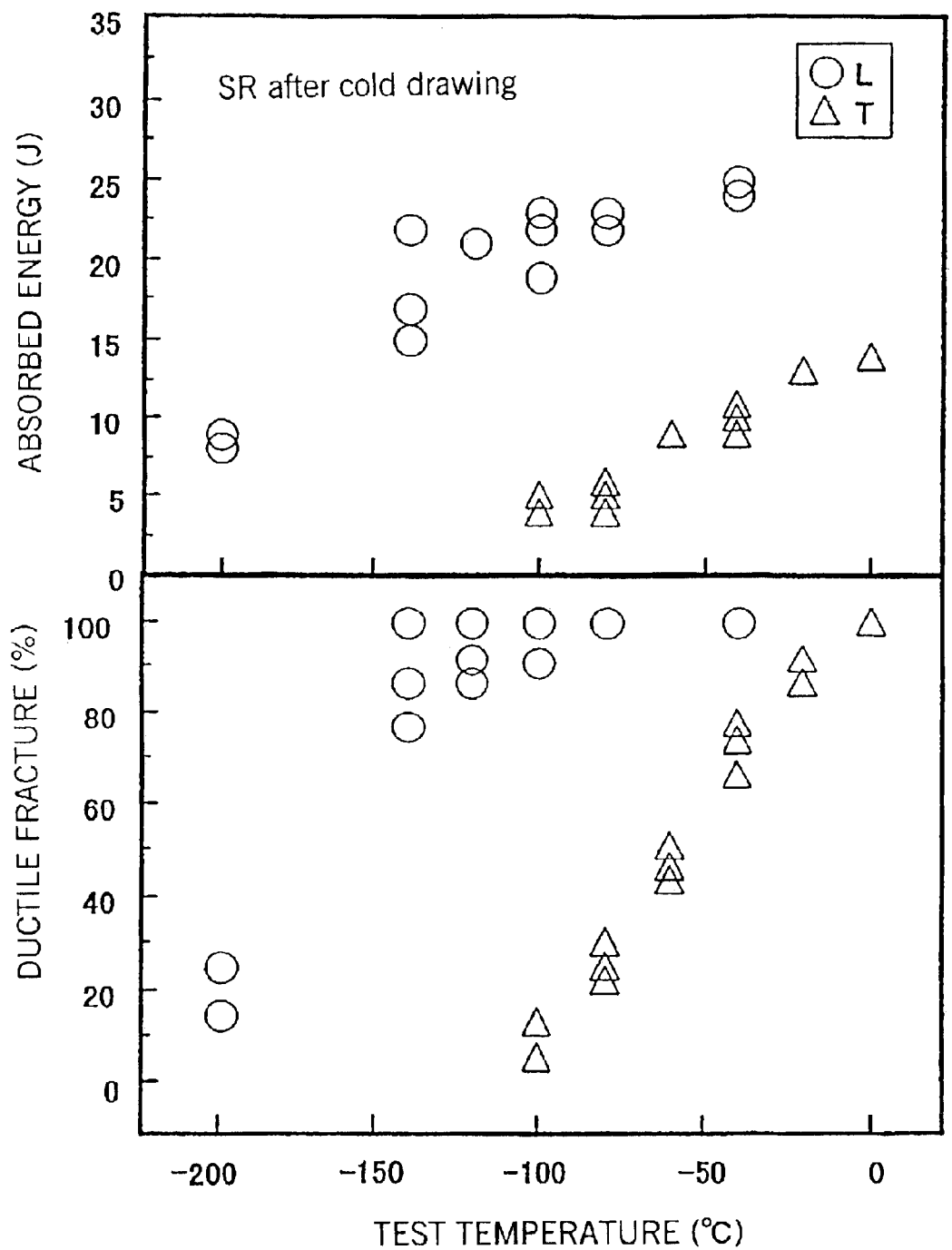
FIG. 2 is a graph showing the anisotropy of the toughness of a steel pipe when SR treatment is carried out after cold working.
Figure 3:
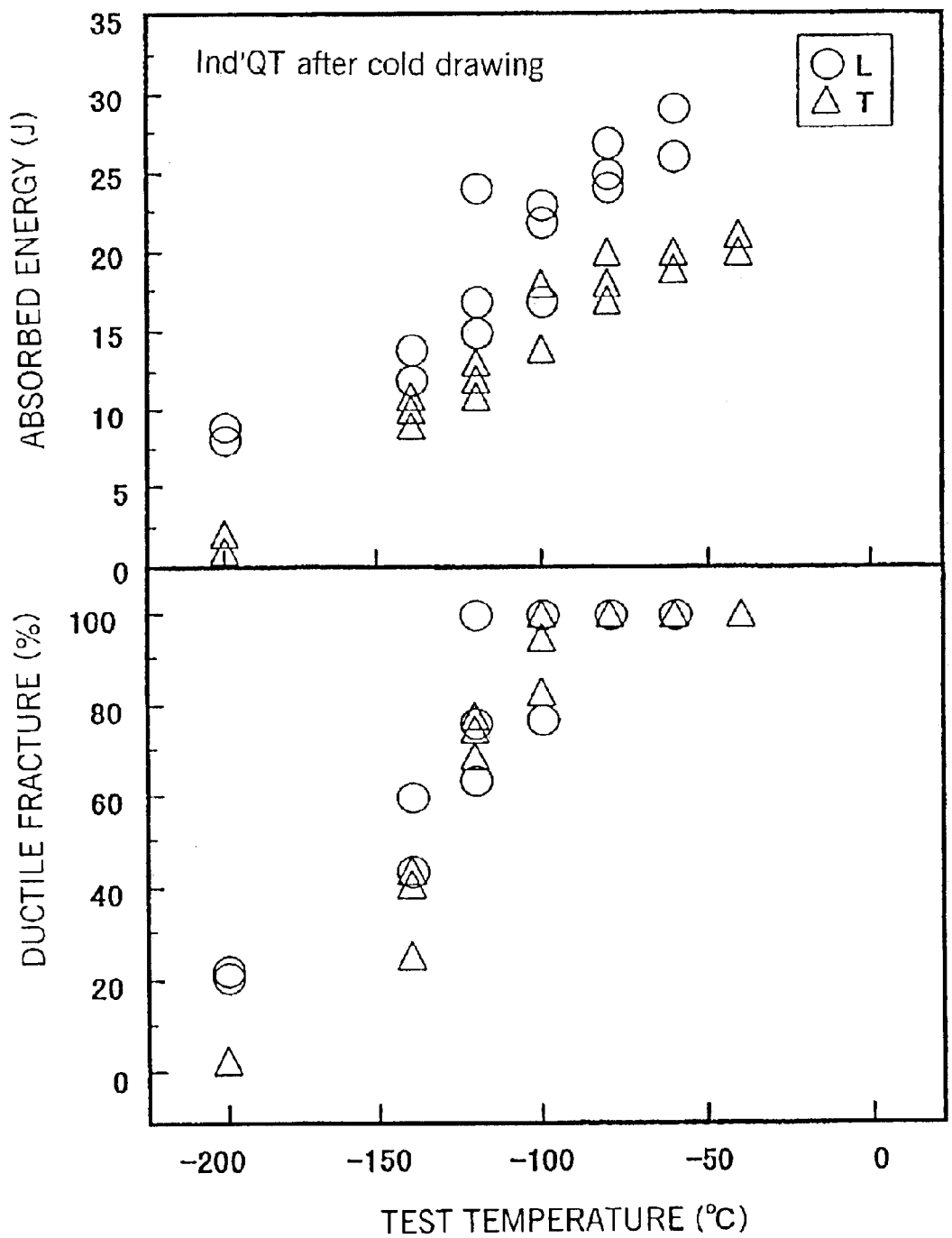
FIG. 3 is a graph showing that anisotropy of toughness is removed by performing quench hardening followed by tempering after cold working.

Below, each of the requirements of the present invention will be described in detail. When describing the content of each element, "%" means "mass percent".

(A) Chemical Composition of the Steel

C:

C is an element which is effective for inexpensively increasing the strength of steel, but if its content is less than 0.05%, it becomes difficult to obtain a desired tensile strength of at least 900 MPa, and if it exceeds 0.20%, workability and weldability decrease. Accordingly, the content of C is 0.05–0.20%. A preferred range for the C content is 0.05–0.14%, and a more preferred range is 0.07–0.13%.

Si:

Si is an element which has a deoxidizing effect and which also increases the hardenability of steel and increases the strength thereof, so it is contained in an amount of at least 0.1%. However, if the content thereof exceeds 1.0%, toughness decreases, so the Si content is 0.1–1.0%. A preferred range for the Si content is 0.2–0.5%.

Mn:

Mn is an element which has a deoxidizing effect and which is effective in increasing the hardenability of steel and increasing strength and toughness thereof. However, if the content thereof is less than 0.20%, an adequate strength and toughness are not obtained, whereas if it exceeds 2.0%, segregation becomes marked, and toughness decreases. Therefore, the content of Mn is 0.20–2.0%. The content of Mn is preferably 0.5–1.5%.

P:

brings about a decrease in toughness caused by grain boundary segregation, and in particular, the decrease in toughness becomes marked if its content exceeds 0.025%. Therefore, the content of P is at most 0.025%. The content of P is preferably at most 0.020%, and still more preferably it is at most 0.015%.

S:

S causes the toughness in the T direction in particular of a steel pipe to decrease. In particular, if its content exceeds 0.010%, the toughness in the T direction of a steel pipe markedly decreases. Accordingly, the S content is at most 0.010%. The S content is preferably at most 0.005% and still more preferably at most 0.003%.

Cr:

Cr is an element which is effective for increasing the strength and toughness of steel, so at least 0.05% thereof is contained. However, if the content thereof exceeds 1.0%, it leads to a decrease in the toughness of welded portions. Therefore, the content of Cr is 0.05–1.0%. A preferred range for the Cr content is 0.2–0.8%, and a more preferred range is 0.4–0.7%.

Al:

Al is an element which has a deoxidizing effect and which is effective for increasing toughness and workability. However, if the content thereof exceeds 0.10%, the occurrence of surface flaws becomes marked. Accordingly, the content of Al is at most 0.10%. The content of Al may be extremely small, so there is no particular lower limit, but it is preferably at least 0.005%. A preferred range for the Al content is 0.005–0.05%. The Al content in the present invention refers to the acid soluble Al (so called "sol. Al") content.

The indispensable components other than Fe contained in a high strength steel pipe for an air bag according to the present invention may be limited to the above-described C, Si, Mn, P, S, Cr, and Al. However, when it is desired to obtain still more strength, bursting resistance, and weldability for an even higher strength steel pipe for an air bag, in addition to the above elements, as necessary, one or more of Mo, Ni, Cu, V, Ti, Nb, and B may be selectively added. Namely, one or more of each of the elements Mo, Ni, Cu, V, Ti, Nb, and B may be added and included as an optional element.

Below, the above-mentioned optional elements will be described.

Mo, Ni, B:

If any of these elements is added, it has the effect of increasing hardenability.

Mo also has the effect of increasing strength through solid solution strengthening and precipitation strengthening. These effects of Mo can be obtained even when the content thereof is an extremely small amount which is typically thought of as being of the level of impurities, but in order to obtain a more marked effect, the content of Mo is preferably at least 0.05%. However, if the content of Mo exceeds 0.50%, welded portions harden and toughness decreases. Therefore, when Mo is added, the content thereof may be at most 0.50% and preferably 0.05–0.50%.

Ni also has the effect of increasing toughness. These effects of Ni can be obtained even with an extremely small content, but in order to obtain a more marked effect, the content of Ni is preferably at least 0.05%. However, Ni is an expensive element, and particularly if its content exceeds 1.5%, costs dramatically increase. Therefore, when Ni is added, the content thereof may be at most 1.5%, and preferably it is 0.05–1.5%.

The effect of B on increasing hardenability can be obtained even with an extremely small content thereof, but in order to obtain a more marked effect, the content of B is preferably at least 0.0003%. However, if the content of B exceeds 0.005%, toughness decreases. Therefore, when B is added, the content thereof may be at most 0.005% and preferably it is 0.0003–0.005%. A more preferred range for the B content is 0.0003–0.002%.

A single one of Mo, Ni, and B can be added, or two or more can be added in combination.

Cu, Ti, Nb: If these elements are added, each has the effect of increasing toughness.

The effect of Cu on increasing toughness can be obtained even with an extremely small content thereof, but in order to obtain a more marked effect, the content of Cu is preferably at least 0.1%. However, Cu decreases the hot workability of steel, so when Cu is added, it is desirable to also add Ni in order to guarantee hot workability. If the content of Cu exceeds 0.5%, there are cases in which good hot workability cannot be guaranteed, even when Ni is also added. Accordingly, when Cu is added, the content thereof may be at most 0.5% and preferably 0.1–0.5%.

The effect of Ti on increasing toughness can be obtained even with an extremely small content thereof, but in order to obtain a more marked effect, the content of Ti is preferably at least 0.003%. However, if the content of Ti exceeds 0.1%, toughness ends up decreasing. Accordingly, when Ti is added, the content thereof may be at most 0.1% and preferably 0.003–0.1%. A more preferred range for the Ti content is 0.003–0.03%, and an even more preferred range is 0.003–0.02%.

The effect of Nb on increasing toughness can be obtained even with an extremely small content thereof, but in order to obtain a more marked effect, the content of Nb is preferably at least 0.003%. However, if the content of Nb exceeds 0.1%, toughness ends up decreasing. Accordingly, when Nb is added, the content thereof may be at most 0.1% and preferably 0.003–0.1%. A more preferred range for the Nb content is 0.003–0.03%, and a still more preferred range is 0.003–0.02%.

Any one of Cu, Ti, and Nb can added alone, or two or more can be added in combination.

V:

If V is added, it has the effect of increasing strength through precipitation strengthening. This effect of V can be obtained even with an extremely small content thereof, but in order to obtain a more marked effect, the content of V is preferably at least 0.01%. However, if the content of V exceeds 0.2%, toughness ends up decreasing. Accordingly, when V is added, the content thereof may be at most 0.2%, and preferably 0.01–0.2%.

When it is desired to guarantee even better bursting resistance in a high strength steel pipe for an air bag, in addition to the above elements, as necessary, as described below, it is possible to further add one or more of Ca, Mg, and REM (rare earth elements) as an optional element.

Ca, Mg, REM: If these elements are added, each has the effect of improving the anisotropy of toughness and increasing toughness in the T direction of a steel pipe, thereby further increasing bursting resistance. This effect can be obtained even with an extremely small content thereof, but in order to obtain a more marked effect, it is preferable to make the content of any of these elements at least 0.0003%. However, if the content of any of these elements exceeds 0.01%, it causes the formation of cluster-shaped inclusions, and the problem of surface flaws develops. Accordingly, when these elements are added, the content of each may be at most 0.01% and preferably 0.0003–0.01%. Any one of Ca, Mg, and REM may be added alone, or two or more may be added in combination.

(B) Production of Pipe

In the present invention, a steel having a chemical composition adjusted in the above manner is used as a material to be processed. As long as it can produce a seamless steel pipe, there are no particular restrictions on the method of producing the seamless steel pipe.

(C) Cold Working

A steel pipe which is formed as a seamless steel pipe in the above-described manner is subjected to cold working under conditions so as to obtain a predetermined dimensional accuracy and surface properties. As long as the cold working can obtain the predetermined dimensional accuracy and surface properties, there are no particular restrictions with respect to the working method which is employed such as cold drawing or cold rolling or the working ratio. However, the working ratio is preferably at least 3% in reduction of area.

(D) Heat Treatment

Following the cold working described above in (C), the steel pipe is subjected to heat treatment in order to guarantee a required tensile strength for the pipe and in order to increase toughness in the T direction and guarantee resistance to bursting.

In order to give a steel pipe a high strength with a tensile strength of at least 900 MPa and bursting resistance, the heat treatment is performed by heating to a temperature which is at least above the $Ac_1$ transformation temperature followed by quenching and subsequent tempering at a temperature which is below the $Ac_1$ transformation temperature.

If the heating temperature prior to quenching is lower than the $Ac_1$ transformation temperature, a good toughness in the T direction (and hence a good resistance to bursting) cannot be guaranteed. The heating temperature is preferably above the $Ac_3$ transformation temperature, which is in the austenite region. Heating at a high temperature for a prolonged period of time results in an increased amount of scale being formed on the surface of the steel pipe, which worsens the dimensional accuracy and the surface properties and leads to a decrease in bursting resistance. Thus, the conditions for heating are preferably rapid heating to a temperature above the $Ac_3$ transformation temperature which is in the austenite region and subsequent temperature holding for a short period of time. For the conditions in this case, it is more preferred that the value of PL expressed by the following Equation (1) be at most 22,000.

$$PL = (T+273) \cdot (20 + \log t) \tag{1}$$

where, T is the heating temperature (° C.), and t is the holding time at that temperature (h).

As the value of PL decreases, the amount of scale which is formed on the surface of the steel pipe is decreased and coarsening of crystal grains is suppressed, resulting in an improved resistance to bursting. Thus, the value of PL is preferably at most 21,000 and more preferably at most 20,000. However, if the value of PL is too small, a desired high strength may not be obtained. Accordingly, the lower limit of the value of PL is preferably approximately 19,000.

A method for accomplishing rapid heating and holding for a short length of time includes, for example, a high frequency induction heating method and a direct electrical conduction heating method. There are no particular restrictions on the means for carrying out the heating, but the heating rate is preferably at least approximately 10° C./sec.

The heating atmosphere when heating to a temperature of at least above the $Ac_1$ transformation temperature is preferably an environment having as low an oxygen potential as possible from the standpoint of suppressing the formation of scale on the surface, and a reducing atmosphere is still more preferred.

Cooling after heating to a temperature of at least above the $Ac_1$ transformation temperature must be quenching (specifically, at an average cooling rate of at least 5° C./sec in the temperature range of 800–500° C.) in order to ensure that a desired tensile strength of at least 900 MPa is obtained in a stable manner. Thus, a quenching method such as water quenching is preferred.

A steel pipe which has been cooled by quenching to the vicinity of room temperature must be tempered at a temperature which is below the $Ac_1$ transformation temperature in order to impart a desired tensile strength of at least 900 MPa and resistance to bursting. If the tempering temperature exceeds the $Ac_1$ transformation temperature, it is difficult to obtain the above properties in a stable and reliable manner. After tempering, bends can be removed using a suitable straightener or the like.

(E) Anisotropy in a Particular Plane Orientation

Figure 4:
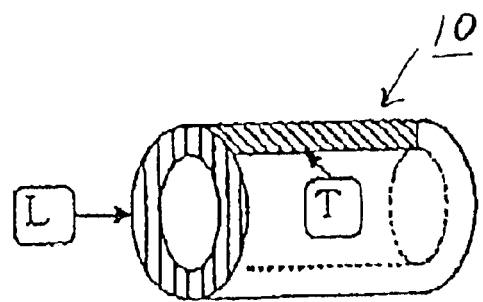
FIG. 4 is an explanatory view showing the test plane for determining the X-ray integrated intensity ratio for a steel pipe according to the present invention.

FIG. 4 is a schematic view of a steel pipe 10. The L surface is shown by vertical hatching, and the T surface is shown by diagonal hatching. The expression "brittle fracture occurs to form an opening running over the entire length of the test piece" for the prior art means that a brittle fracture takes place along the T surface.

First, in order to evaluate the texture of a steel pipe according to the present invention, the X-ray integrated intensity ratio was measured for the {110}, {200}, {211}, and {222} planes in both the L and T surfaces.

The L and T surfaces mean surfaces which are perpendicular with respect to the stress axes in the axial direction and the circumferential direction, respectively. The X-ray integrated intensity ratio is a value obtained by dividing the peak area of a given plane orientation obtained by X-ray spectroscopic analysis by the peak area for the same plane orientation from a sample having a random crystal orientation such as a powder sample.

Figure 5:
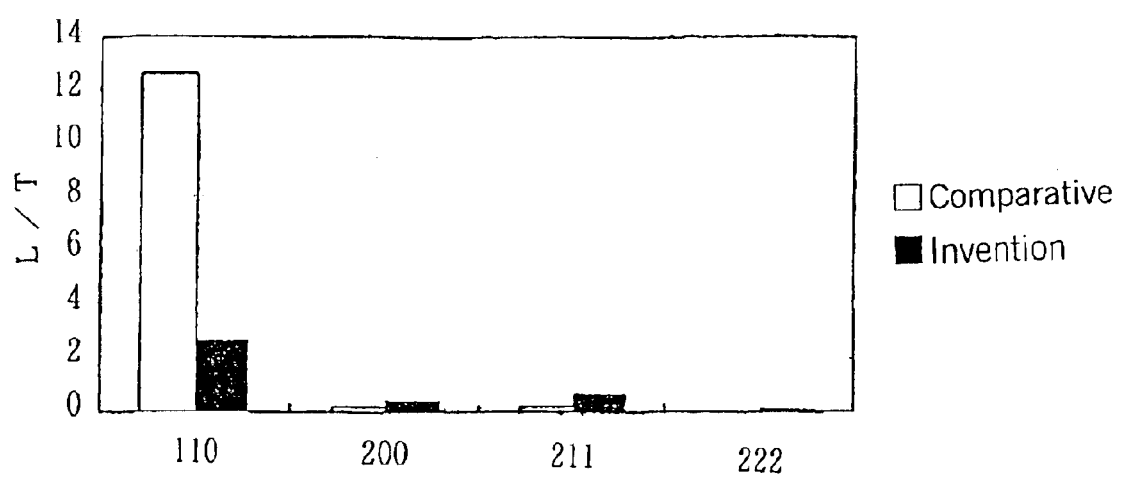
FIG. 5 is a graph showing the anisotropy of a texture in an example of the present invention and a comparative example.

Here, in order to further evaluate the anisotropy of the texture, the X-ray integrated intensity ratio for the L surface was divided by that for the T surface for each plane orientation measured to make a comparison in terms of the resulting quotient. The results are shown in FIG. 5. When the manufacturing conditions were varied, the above quotient (L/T ratio) for the {110} plane showed the largest change, and it was found that a structural evaluation can be made based on the L/T ratio for the X-ray integrated intensity ratio of the {110} plane (indicated as L/T 110).

Figure 6:
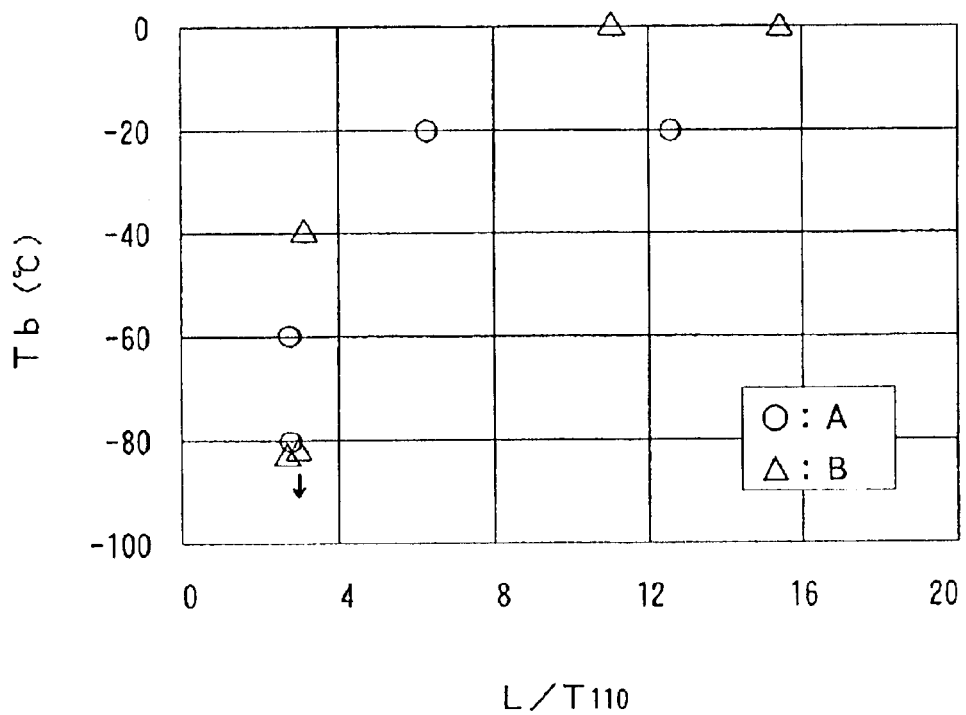
FIG. 6 is a graph showing the relationship between a texture and internal pressure bursting properties.

FIG. 6 shows test results investigating the texture and the internal pressure bursting properties for a steel pipe which was manufactured while varying the texture by varying the heat treatment conditions. In the figure, A and B indicate Steels A and B, respectively, of Table 1 which satisfy the requirements for the components defined by the present invention, and are respectively indicated by the ○ and △ marks. A fracture test was carried out at a temperature intervals of 20° C. from 0° C. to −80° C., and the fracture surface was examined. As a result of evaluating the internal pressure bursting properties in terms of the critical temperature (indicated as Tb) producing a ductile fracture surface, it was found that the internal pressure bursting properties can be improved by decreasing the anisotropy of the texture of the {110} plane orientation in the T surface and the L surface, i.e., by having the value of L/T110 approach 1.

TABLE 1

| Steel | C | Si | Mn | Cu | Cr | Ni | Mo | Ti | Nb |
|---|---|---|---|---|---|---|---|---|---|
| | | | | (mass %) | | | | | |
| A | 0.10 | 0.28 | 1.30 | 0.26 | 0.11 | 0.42 | — | 0.02 | 0.02 |
| B | 0.11 | 0.22 | 1.28 | — | 0.63 | 0.05 | 0.31 | 0.02 | 0.03 |

A bursting test has the problems that it is time-consuming and expensive.

In order to solve these problems, the results of a bursting test and a Charpy impact test, which is a widely-used test, were compared.

Figure 7:
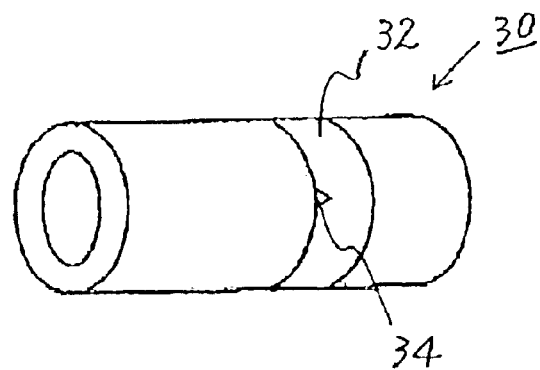
FIG. 7 is an explanatory view of a test piece taken in a toughness test of a steel pipe according to the present invention.

For toughness, as shown in FIG. 7, an impact test piece formed by cutting a plate 32 from a steel pipe 30 in the circumferential direction, unrolling it, and forming a V-notch 34 therein was used. This was because of letting a crack to propagate in the axial direction of the steel pipe in the same manner as in a bursting test. In a Charpy impact test, evaluation was based on the lower temperature limit (indicated as vTrs100) for guaranteeing a 100% ductile fracture.

Figure 8:
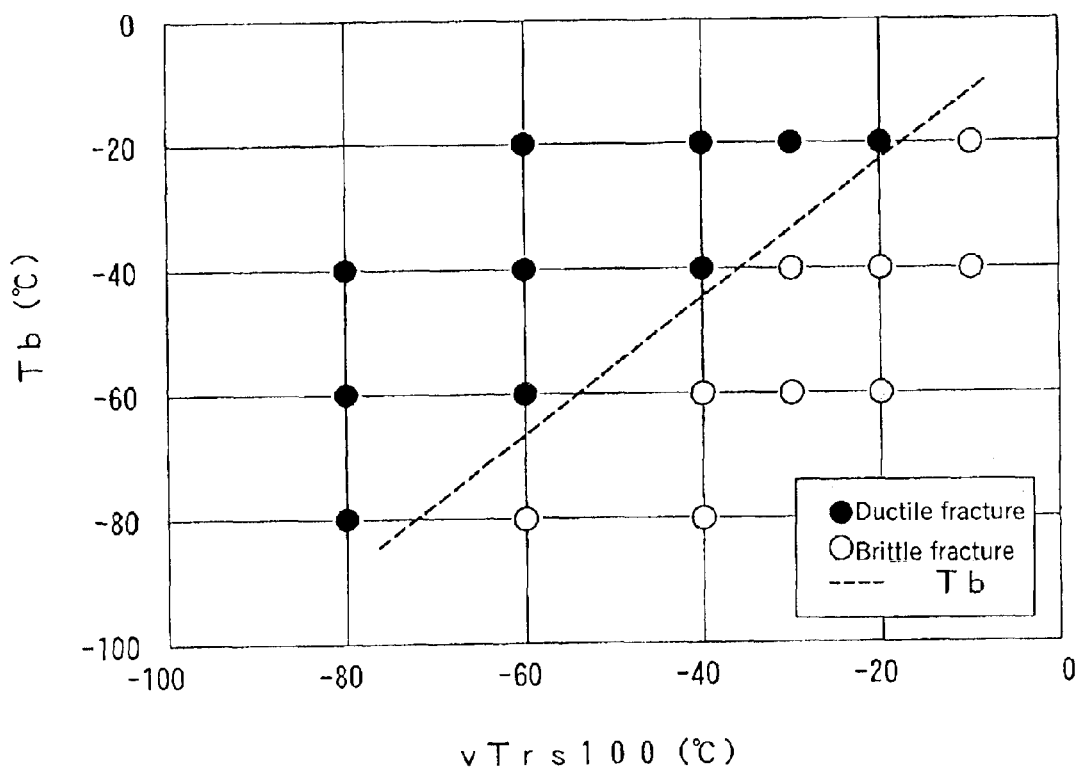
FIG. 8 is a graph showing a comparison of the results of a Charpy impact test and the results of a bursting test.

From these results, it was found that as shown in FIG. 8, the lowest or critical temperature (Tb) for producing a ductile fracture surface in an internal pressure bursting test roughly matches the results of vTrs 100. Namely, this means that evaluation of vTrs100 in a Charpy impact test makes it possible to estimate the internal pressure bursting fracture properties. Accordingly, in the below-described examples, Tb is evaluated by vTrs100.

(F) Accumulator for an Air bag

Figure 9:
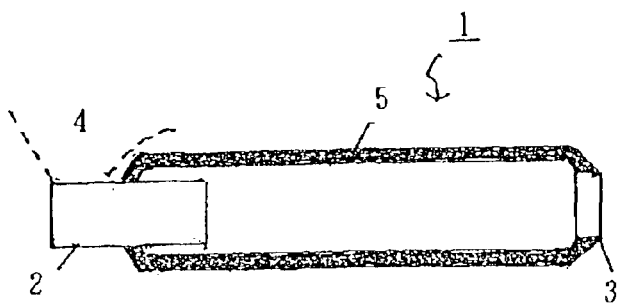
FIG. 9 is a schematic cross-sectional view of an accumulator for an air bag according to the present invention.

FIG. 9 is a schematic cross-sectional view showing an example of an accumulator for an air bag according to the present invention. In the figure, an accumulator 1 according to the present invention is constituted by a pipe body 5 which is formed by cutting a steel pipe and then subjecting both ends to spinning to reduce the diameter, and a lid 3 which is then welded to one end of the pipe body 5. An air bag actuating mechanism 2 is mounted on the other end of the pipe 5. When the air bag actuating mechanism 2 senses an impact and actuates, high pressure gas filling the interior of the accumulator 1 is blown out to trigger the operation of an air bag 4 shown by dashed lines in the figure.

The following examples are given to illustrate the present invention in further detail.

EXAMPLES

From a billet having the chemical composition shown in Table 2, a seamless steel pipe having an outer diameter of 70 mm and a wall thickness of 4.1 mm was produced by piercing and rolling using standard equipment of a Mannesmann piercer and a mandrel mill and it was then subjected to cold drawing in a conventional manner so as to have an outer diameter of 60.33 mm and a wall thickness of 3.35 mm.

TABLE 2

| Steel | Chemical Composition (mass %) Balance: Fe and impurities | | | | | | | | | |
|---|---|---|---|---|---|---|---|---|---|---|
| | C | Si | Mn | P | S | Cr | Mo | Ni | Cu | V |
| a | 0.12 | 0.29 | 1.53 | 0.008 | 0.001 | 0.56 | — | — | — | — |
| b | 0.11 | 0.31 | 1.32 | 0.014 | 0.001 | 0.61 | 0.32 | 0.27 | 0.21 | — |
| c | 0.13 | 0.31 | 1.25 | 0.017 | 0.001 | 0.45 | 0.32 | 0.30 | 0.24 | — |
| d | 0.12 | 0.30 | 1.35 | 0.017 | <0.001 | 0.48 | 0.33 | 0.23 | 0.17 | — |
| e | 0.10 | 0.28 | 1.29 | 0.015 | <0.001 | 0.40 | 0.39 | 0.25 | 0.17 | 0.05 |
| f | 0.13 | 0.32 | 1.25 | 0.014 | 0.001 | 0.46 | 0.31 | 0.22 | 0.22 | — |
| g | 0.10 | 0.31 | 1.32 | 0.015 | 0.001 | 0.42 | 0.38 | — | — | — |
| h | 0.08 | 0.26 | 1.30 | 0.016 | <0.001 | 0.47 | 0.36 | 0.28 | 0.22 | — |
| i | 0.13 | 0.34 | 1.31 | 0.015 | 0.002 | 0.44 | 0.35 | 0.23 | — | — |
| j | 0.13 | 0.78 | 1.32 | 0.013 | 0.001 | 0.47 | 0.32 | — | — | 0.03 |
| k | 0.09 | 0.82 | 1.28 | 0.013 | 0.001 | 0.44 | 0.32 | 0.23 | 0.22 | — |
| l | 0.08 | 0.34 | 1.33 | *0.035 | 0.001 | 0.48 | 0.38 | 0.20 | 0.24 | — |
| m | 0.09 | 0.30 | 1.30 | 0.014 | *0.025 | 0.50 | 0.31 | 0.25 | 0.19 | — |
| n | 0.12 | 0.26 | 1.34 | 0.014 | 0.002 | 0.49 | 0.35 | — | *0.68 | — |

| Steel | Chemical Composition (mass %) Balance: Fe and impurities | | | | | | | $A_{c1}$ (° C.) | $A_{c2}$ (° C.) |
|---|---|---|---|---|---|---|---|---|---|
| | Ti | Nb | Al | B | Ca | Mg | REM | | |
| a | — | — | 0.014 | — | — | — | — | 721 | 847 |
| b | — | — | 0.025 | — | — | — | — | 720 | 859 |
| c | 0.008 | — | 0.034 | — | — | — | — | 721 | 857 |
| d | 0.006 | 0.018 | 0.031 | — | 0.0010 | — | — | 720 | 853 |
| e | 0.010 | 0.024 | 0.025 | — | 0.0014 | — | — | 718 | 867 |
| f | 0.011 | 0.020 | 0.029 | — | 0.0016 | — | — | 720 | 856 |
| g | 0.009 | 0.024 | 0.028 | 0.0008 | 0.0022 | — | — | 721 | 869 |
| h | 0.009 | — | 0.024 | — | 0.0009 | 0.0013 | — | 716 | 868 |
| i | 0.008 | 0.021 | 0.033 | — | — | — | 0.0025 | 720 | 857 |
| j | 0.006 | 0.017 | 0.031 | — | — | — | — | 723 | 860 |
| k | 0.008 | 0.017 | 0.028 | — | 0.0015 | — | — | 720 | 866 |
| l | 0.009 | 0.021 | 0.032 | — | — | — | — | 718 | 875 |
| m | 0.014 | 0.023 | 0.027 | — | — | — | — | 718 | 862 |
| n | 0.007 | 0.024 | 0.024 | — | 0.0015 | — | — | 722 | 861 |

An * mark indicates values outside the conditions defined by the present invention.

In Table 2, Steels a–k are steels for which the composition satisfies the requirements of the present invention, and Steels l–n are steels for which any one of the elements does not satisfy the conditions defined by the present invention.

Each of the resulting steel pipes was subjected to heat treatment under the conditions shown in Table 3. The quenching (hardening) shown in Table 3 was carried out by the method shown in the column of Remarks, in which "Ind'Q" indicates that heating was carried out in a high frequency induction heating apparatus at a heating rate of 20° C./sec followed by water quenching, and "FQ" indicates that heating was carried out in a normal walking beam furnace followed by water quenching. Tempering was carried out by holding the indicated temperature for 30 minutes in an ordinary walking beam furnace. For Test Nos. 10 and 11, hardening was not carried out and only SR treatment was carried out.

TABLE 3

| Test No. | Steel | Quenching (hardening) | | | Tempering temp. (° C.) | Tensile strength (MPa) | Charpy properties | | Bursting resistance | Remarks |
|---|---|---|---|---|---|---|---|---|---|---|
| | | Temp. (° C.) | Holding time | PL value | | | vTrs in L direction (° C.) | vTrs in T direction (° C.) | | |
| 1 | a | 910 | 5 sec. | 20280 | 510 | 905 | −106 | −100 | 0 | Ind'Q |
| 2 | b | 900 | 3 sec. | 19848 | 530 | 917 | −130 | −128 | 0 | Ind'Q |
| 3 | c | 930 | 10 min. | 23124 | 510 | 923 | −95 | −93 | 0 | FQ |
| 4 | d | 920 | 2 sec. | 19976 | 530 | 906 | −145 | −140 | 0 | Ind'Q |
| 5 | e | 950 | 5 min. | 23140 | 540 | 936 | −106 | −106 | 0 | FQ |
| 6 | f | 1000 | 1 sec. | 20933 | 530 | 932 | −138 | −132 | 0 | Ind'Q |
| 7 | g | 920 | 5 min. | 22573 | 530 | 909 | −117 | −111 | 0 | FQ |
| 8 | h | 910 | 5 sec. | 20280 | 530 | 946 | −134 | −133 | 0 | Ind'Q |
| 9 | i | 920 | 2 sec. | 19976 | 530 | 947 | −149 | −144 | 0 | Ind'Q |
| *10 | j | *— | *— | *— | 530 | 885 | −102 | −45 | 5 | — |
| *11 | k | *— | *— | *— | 520 | 892 | −108 | −49 | 5 | — |
| *12 | *l | 920 | 10 min. | 22932 | 530 | 923 | −67 | −60 | 2 | FQ |
| *13 | *m | 940 | 10 min. | 23316 | 540 | 925 | −86 | −56 | 3 | FQ |
| *14 | *n | 930 | 10 min. | 23124 | 530 | 931 | −100 | −97 | 0 | FQ, flaws (1) |

TABLE 3-continued

| Test No. | Steel | Quenching (hardening) | | | Tempering temp. (° C.) | Tensile strength (MPa) | Charpy properties | | Bursting resistance | Remarks |
|---|---|---|---|---|---|---|---|---|---|---|
| | | Temp. (° C.) | Holding time | PL value | | | vTrs in L direction (° C.) | vTrs in T direction (° C.) | | |

An * mark indicates values outside the conditions defined by the present invention.
(1): flaws formed during pipe production A tensile test, a Charpy impact test, and a bursting test were carried out for each of the heat-treated steel pipes.

Thus, the tensile test was carried out according to the tensile test method for metallic materials specified by JIS Z 2241 using a No. 11 test piece specified by JIS Z 2201. The Charpy impact test was conducted using V-notched Charpy test pieces having a width of 2.5 mm as specified by JIS Z 2202 which were taken in the longitudinal direction of rolling (the L direction) and the direction perpendicular to the rolling direction (the T direction) from a steel pipe which had been unrolled at room temperature, and toughness was evaluated based on the ductile-brittle transition temperature (vTrs). The bursting test was carried out by cutting 5 pipe specimens having a length of 250 mm from each steel pipe and closing the opposite ends of each 250 mm long pipe specimen by welding, and causing each specimen to burst at −40° C. The propagation of the crack in the five bursted specimens was observed, and resistance to bursting was evaluated based on the number of pipe specimens for which the cracks propagated to either one of the ends.

The results of the above tests are together shown in Table 3.

As can be seen from Table 3, in the case of Test Nos. 1–9 which satisfy the conditions defined for the present invention, the tensile strength was a high strength of at least 900 MPa, the ductile-brittle fracture transition temperature in the Charpy test in the T direction was sufficiently low, and in the bursting test, cracks did not propagate to the ends. It is clear that of Test Nos. 1–9, those including Ca, Mg, or REM in the composition had an even better toughness in the T direction compared to those that did not.

It is also clear that those which had heated in a high frequency induction heating apparatus so as to give a value PL expressed by Equation (1) of at most 22,000 followed by water quenching had an even better toughness in the T direction.

In contrast, in the case of Test Nos. 10–14, compared to Test Nos. 1–9 according to the present invention, the toughness in the T direction was low and the resistance to bursting was inferior, or flaws were formed during hot working to produce the pipe, so they had problems.

For Steel c and Steel j of Table 1 in particular, in order to investigate low temperature toughness by varying L/T110, additional seamless steel pipes were manufactured in the same manner as described above except that the reduction ratio in the cold working and the heat treatment temperature were varied. The heat treatment conditions were selected so as to achieve a tensile strength of at least 900 MPa.

The low temperature toughness was evaluated by performing a Charpy impact test using an impact test piece in accordance with JIS Z 2202 (10 mm×2.5 mm, 2 V-notched), which was prepared by forming V-notches 34 into a plate 32 which was cut from a steel pipe 30 in the circumferential direction as shown in FIG. 7 and then unrolled, in terms of the lower temperature limit (vTrs 100) which can guarantee a 100% ductile fracture.

Figure 10:
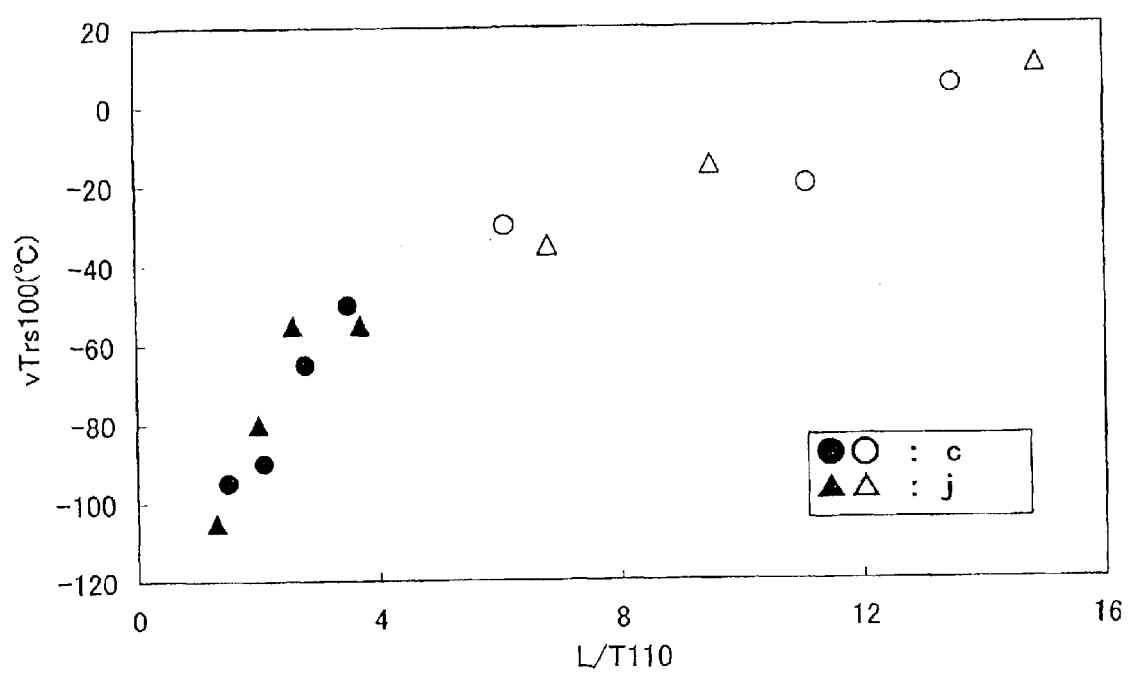
FIG. 10 is a graph showing the combined results of the examples.

The results are collectively shown in Table 4 and FIG. 10. In the figure, data having L/T 110 of less than or equal to 4 are shown by a blackened-in marks, and those for which L/T 110 is greater than 4 are shown by a hollow mark. As can be seen from these results, when L/T 110 is at most 4, Tb and vTrs100 are less than or equal to −40° C., showing that an adequate low temperature toughness for a steel pipe for an air bag is obtained.

TABLE 4

| Run No. | Steel | L/T 110 | Tb (° C.)* | vTrs 100 (° C.) | Remarks | Mark in FIG. 10 |
|---|---|---|---|---|---|---|
| 1 | c | 1.5 | <−80 | −95 | invention | ● |
| 2 | c | 2.1 | <−80 | −90 | invention | ● |
| 3 | c | 2.8 | −60 | −65 | invention | ● |
| 4 | c | 3.5 | −60 | −50 | invention | ● |
| 5 | j | 1.3 | <−80 | −105 | invention | ▲ |
| 6 | j | 2 | <−80 | −80 | invention | ▲ |
| 7 | j | 2.6 | −60 | −55 | invention | ▲ |
| 8 | j | 3.7 | −60 | −55 | invention | ▲ |
| 9 | c | 6.1 | −20 | −30 | comparative | ○ |
| 10 | c | 11.1 | −20 | −20 | comparative | ○ |
| 11 | c | 13.5 | 0 | 5 | comparative | ○ |
| 12 | j | 6.8 | −40 | −35 | comparative | △ |
| 13 | j | 9.5 | −20 | −15 | comparative | △ |
| 14 | j | 14.9 | 0 | −10 | comparative | △ |

*"<−80" means that a bursting test at −80° C. gave a ductile surface and any test was not carried at a lower temperature.

Industrial Applicability

According to the present invention, a high strength steel pipe is obtained which has high dimensional accuracy, excellent workability and weldability, and a high tensile strength of at least 900 MPa and sufficient toughness and bursting resistance even at a low temperature of −40° C., and a high strength steel pipe for an air bag can be provided which can adequately cope with higher pressures of gas blown into an air bag and lower wall thicknesses of steel pipes.

Accordingly, a pipe for an air bag having excellent quality not seen in the prior art is obtained, so the present invention has great practical significance.

What is claimed is:

1. A process of manufacturing a high strength steel pipe for an air bag having excellent bursting resistance, characterized by producing a pipe from a steel material having a composition, in mass %, of:
  C: 0.05–0.20%, Si: 0.1–1.0%, Mn: 0.20–2.0%, P: at most 0.025%, S: at most 0.010%, Cr: 0.05–1.0%, Al: at most 0.10%, and a remainder of Fe and impurities,
  subjecting the steel pipe to cold working to obtain predetermined dimensions, then heating it to a temperature of at least the $Ac_1$ transformation temperature followed by quenching, and then performing tempering at a temperature no higher than the $Ac_1$ transformation temperature, the steel pipe having a tensile strength of 900 Mpa or more.

2. A manufacturing process as set forth in claim 1, wherein the steel composition further contains, in mass %, at least one of Cu: at most 0.5%, Ti: at most 0.1%, and Nb: at most 0.1%.

3. A manufacturing process as set forth in claim 1, wherein the steel composition further contains, in mass %, V; at most 0.2%.

4. A manufacturing process as set forth in claim 1, wherein the steel composition further contains, in mass %, at least one of Ca: at most 0.01%, Mg: at most 0.01%, and REM (rare earth elements): at most 0.01%.

5. A steel pipe for an air bag manufactured by claim 1, wherein the L/T ratio of the X-ray integrated intensity ratio of the {110} plane in a plane perpendicular to the axial direction L to that in a plane perpendicular to the circumferential direction T of the steel pipe for an air bag is at most 4.

6. An accumulator for an air bag made from a steel pipe for an air bag as set forth in claim 5.

7. A process of manufacturing a high strength steel pipe for an air bag having excellent bursting resistance, characterized by producing a pipe from a steel material having a composition, in mass %, of:

C: 0.05–0.20%, Si: 0.1–1.0%, Mn: 0.20–2.0%, P: at most 0.025%, S: at most 0.010%, Cr: 0.05–1.0%, Al: at most 0.10%, at least one of Mo: at most 0.50%, Ni: at most 1.5%, and B: at most 0.005%, and a remainder of Fe and impurities, subjecting the steel pipe to cold working to obtain predetermined dimensions, then heating it to a temperature of at least the $Ac_1$ transformation temperature followed by quenching, and then performing tempering at a temperature no higher than the $Ac_1$ transformation temperature, the steel pipe having a tensile strength of 900 Mpa or more.

8. A manufacturing process as set forth in claim 7, wherein the steel composition further contains, in mass %, V; at most 0.2%.

9. A manufacturing process as set forth in claim 7, wherein the steel composition further contains, in mass %, at least one of Ca: at most 0.01%, Mg: at most 0.01%, and REM (rare earth elements): at most 0.01%.

10. A steel pipe for an air bag manufactured by claim 7, wherein the L/T ratio of the X-ray integrated intensity ratio of the {110} plane in a plane perpendicular to the axial direction L to that in a plane perpendicular to the circumferential direction T of the steel pipe for an air bag is at most 4.

11. An accumulator for an air bag made from a steel pipe for an air bag as set forth in claim 10.

12. A process of manufacturing a high strength steel pipe for an air bag having excellent bursting resistance, characterized by producing a pipe from a steel material having a composition, in mass %, of:

C: 0.05–0.20%, Si: 0.1–1.0%, Mn: 0.20–2.0%, P: at most 0.025%, S: at most 0.010%, Cr: 0.05–1.0%, Al: at most 0.10%, at least one of Mo: at most 0.50%, Ni: at most 1.5%, and B: at most 0.005%, at least one of Cu: at most 0.50%, Ti: at most 0.1%, and Nb: at most 0.1%, and a remainder of Fe and impurities, subjecting the steel pipe to cold working to obtain predetermined dimensions, then heating it to a temperature of at least the $Ac_1$ transformation temperature followed by quenching, and then performing tempering at a temperature no higher than the $Ac_1$ transformation temperature, the steel pipe having a tensile strength of 900 Mpa or more.

13. A manufacturing process as set forth in claim 12, wherein the steel composition further contains, in mass %, V; at most 0.2%.

14. A manufacturing process as set forth in claim 12, wherein the steel composition further contains, in mass %, at least one of Ca: at most 0.01%, Mg: at most 0.01%, and REM (rare earth elements): at most 0.01%.

15. A steel pipe for an air bag manufactured by claim 12, wherein the L/T ratio of the X-ray integrated intensity ratio of the {110} plane in a plane perpendicular to the axial direction L to that in a plane perpendicular to the circumferential direction T of the steel pipe for an air bag is at most 4.

16. An accumulator for an air bag made from a steel pipe for an air bag as set forth in claim 15.

* * * * *